United States Patent

Butler et al.

[15] 3,644,229
[45] Feb. 22, 1972

[54] HYDROPHILIC-POROMERIC FOAM METHOD OF MAKING, AND ARTICLES MADE THEREFROM

[72] Inventors: Eugene B. Butler, Kent; Ivan A. Fak, Munroe Falls; Lawrene L. Line, Kent, all of Ohio

[73] Assignee: The General Tire & Rubber Company

[22] Filed: June 1, 1970

[21] Appl. No.: 42,592

[52] U.S. Cl. ............... 260/2.5 AD, 117/140 A, 260/2.5 AL, 260/2.5 P, 260/2.5 AK, 260/2.5 AG, 260/2.5 AY, 260/859 PV
[51] Int. Cl. .................................... C08f 47/10, C08g 22/44
[58] Field of Search ............ 117/140 A; 260/2.5 AD, 2.5 AY, 260/859 PV, 2.5 AG, 2.5 P, 2.5 AM, 2.5 AK

[56] References Cited

UNITED STATES PATENTS

| | | | |
|---|---|---|---|
| 2,898,312 | 8/1959 | Szukiewicz et al. | 260/2.5 |
| 2,917,405 | 12/1959 | Gaylord | 117/140 |
| 3,301,798 | 1/1967 | Waterman et al. | 260/2.5 |
| 3,432,449 | 3/1969 | Deal et al. | 260/2.5 |
| 3,498,829 | 3/1970 | Lifland et al. | 117/138.5 |
| 3,536,796 | 10/1970 | Rock | 260/2.5 |
| 3,540,916 | 11/1970 | Fukada et al. | 117/63 |

*Primary Examiner*—Donald E. Czaja
*Assistant Examiner*—Ronald W. Griffin
*Attorney*—Frank C. Rote, Jr. and Denbigh S. Matthews

[57] ABSTRACT

This invention relates to a hydrophilic and poromeric foam made from a blend of plastisol grade vinyl chloride resin, at least one compatible liquid plasticizer, a stabilizer for said vinyl chloride resin, a polyurethane precursor and a mixture of specific emulsifiers.

15 Claims, No Drawings

HYDROPHILIC-POROMERIC FOAM METHOD OF MAKING, AND ARTICLES MADE THEREFROM

BACKGROUND OF THE INVENTION

1. Field of the Invention

This invention relates to the field of synthetic poromeric materials sometimes known as manmade leathers. More particularly, this invention relates to synthetic leather materials based on vinyl chloride polymers that are specially fortified with urethane polymers.

2. Description of the Prior Art

Synthetic poromeric materials find their widest use in articles that are in contact with or adjacent to the human body, such as footwear and furniture upholstery, so that the poromericity enables removal of accumulated moisture from the skin and makes the user more comfortable.

Synthetic poromeric materials also have other properties that make them desirable; scuff resistance of natural leather is rather low resulting in rapid wearing of the finish and surface of leather articles whereas synthetic poromerics exhibit a high degree of scuff resistance and have doubled or tripled the useful life of some articles made therefrom such as shoes. In addition, the scuff resistance of these synthetic poromerics relieves and in many cases eliminates the need for polishing. Other properties such as the ability to hold shape, water repellency, high strength, and high tear resistance have given these manmade materials a firm commercial position.

These materials have not, however, achieved the degree of commercial acceptance originally predicted. There are many theories as to why this is but none have been definitely established. It appears, however, that one of the major reasons for this rather restricted acceptance has been the high cost of the materials along with the inability to combine most or all of the desirable asthetic and other properties of natural leather.

As an example, most manmade leathers do not equal natural leather in the degree of hydrophilicity even though they surpass natural leather in many cases in the property of poromericity.[1] ([1.] The term "hydrophilicity" or "hydrophilic" is generally defined as the property of having an affinity for water. The term "poromericity" or "poromeric" has not received such extensive use as to mark its place in common dictionaries, however, it is generally used in the shoe trade to define the property of passing moisture vapor across or through a membrane through the apparent utilization of tiny pores in the membrane. The disparity between natural and manmade leather in regard to these two properties is striking; for instance, most manmade leathers are of a magnitude of 2 to 10 times more poromeric than natural leather whereas they absorb water or are hydrophilic only to the extent of about 7 percent of natural leather.

This may be the reason that persons wearing manmade leather shoes complain that the shoes are "hot" wearing, i.e., the foot perspires faster than the poromeric material can transmit the moisture to the outside of the shoe (for evaporation) so that this excess moisture is not otherwise absorbed or removed and therefore "puddles" or accumulates in the stocking to cause uncomfortableness. It is, of course, well known that shoes made of natural leather absorb (by hydrophilicity) a large amount of moisture from the foot during the time they are worn and give up this moisture (dry out) when not used; this absorption of foot perspiration makes the natural leather shoe noticeably cooler wearing.

The prior art has had extreme difficulties in combining many of the asthetic and other properties, most importantly poromericity and hydrophilicity, into manmade leather while retaining other properties at desired levels. For instance, it is known to mechanically whip air into (i.e., froth) a polyvinyl chloride plastisol resin containing an emulsifier and then fuse it to form a polymeric hydrophilic foam. (Reference U.S. Pat. Nos. 3,288,729; 3,301,798; and 3,432,449) however, these foams have extremely poor scuff resistance, tensile strength, and tear strength so that they cannot be used as direct replacements for manmade leathers. It is also known that polyvinyl chloride plastisols may be saturated into fibrous mats, chemically blown, and then compressed during fusing to give a rather strong poromeric material (Reference U.S. Pat. No. 2,917,405), however, such a material is not hydrophilic and does not exhibit the asthetic properties of break, drape, and hand sufficient to be utilized as a replacement for natural leather. Further still, it is known to combine water and a polyester with a vinyl chloride plastisol and thereafter treat it with a polyisocyanate to form a chemically blown, closed cell cushion material of rather high strength (Reference U.S. Pat. No. 2,898,312); however such material is neither poromeric nor hydrophilic.

This invention is based upon the discovery that a hydrophilic-poromeric foam may be inexpensively made that is strong and highly abrasion resistant and furthermore that may be made into a synthetic leather material incorporating so many of the asthetic and other properties of natural leather that only the most discerning individual can tell that it is not a natural leather product. The foam of this invention comprises a cured frothed mixture of a fluidic blend comprising a vinyl plastisol and a specific emulsifier with a limited amount of a fluidic polyurethane precursor in such a manner as to form a light weight frothed material. This foam and products made therefrom combine the properties of poromericity and hydrophilicity similar to natural leather with exceptional scuff resistance, tensile strength, and certain other properties, mostly in excess of the respective properties of natural leather, while at the same time costing substantially less on a volume basis than most manmade leathers. The foam may be used alone, utilized as a top coating for fabrics and other substrates, used in supported sheets for a variety of purposes, and also saturated into a fibrous mat to form the above-disclosed synthetic leatherlike material.

Therefore, the main object of this invention is a synthetic poromeric-hydrophilic foam for use in a wide range of products and articles. Other objects include a composition that is mechanically frothed to give a uniform cell size and that has exceptional physical and asthetic properties among them being hydrophilicity upwards of 100 percent by weight and good hand, break, drape, wet-strength, flexibility, etc.; a process that produces a poromeric-hydrophilic material of uniform cell size in a variety of densities and that is applicable to produce supported and unsupported materials as well as saturants and top coatings, that utilizes a relatively small amount of equipment, and that is amenable to automatic and semiautomatic process control; and a synthetic leather material made by saturating the novel composition into a fibrous material that combines poromericity and hydrophilicity with exceptional scuff resistance, hand, feel, flexibility, tensile strength, elongation, and tear resistance.

SUMMARY OF THE INVENTION

This invention concerns a hydrophilic, poromeric foam comprising the cured frothed mixture of (I) a fluidic blend comprising 100 parts by weight of a plastisol grade vinyl chloride resin, between about 50 to 100 parts by weight of at least one compatible liquid plasticizer, a stabilizer for the vinyl chloride resin and about 10 to about 16 parts by weight of an emulsifier comprising between 36–46 weight percent of a saturated or unsaturated fatty acid having from 12–24 carbon atoms or mixtures thereof; between 27–37 weight percent of an alkali salt of a saturated or unsaturated fatty acid having from 12–24 carbon atoms or mixtures thereof; between 6–16 percent of a member selected from the group consisting of potassium acid phthalate, sodium phthalate, and sodium acid phthalate; between 4–8 weight percent water; between 4–6 weight percent of a saturated aliphatic glycol; between 2–4 weight percent of a low molecular weight hydrocarbon oil; and between 1.5–2.5 weight percent of silicic acid; and, (II) between about 7 to about 19 parts by weight of a fluidic polyurethane precursor prepared from the reaction between a polyol and a polyisocyanate.

DESCRIPTION OF THE PREFERRED EMBODIMENT

The poromeric-hydrophilic foam of this invention may be used in a wide variety of products especially where body comfort is of prime concern. There are many articles that may be covered with or employ this material such as furniture and upholstery therefore, clothing, gloves, seats and cushions, beds and the like, and footwear. As will be described in more detail later, the foam may be produced in sheets and films, cast upon a backing material, or saturated into fibrous mats. All such uses are fully contemplated in this invention.

The hydrophilic-poromeric foam of this invention is made from two components, the first of which (I) comprises a plastisol grade vinyl chloride resin, at least one compatible liquid plasticizer therefore, and a special emulsifier to be hereinafter more specifically enumerated.

Vinyl chloride resins are well-known polymerized materials made from vinyl chloride monomer. Vinyl chloride is produced by a number of different processes such as by the reaction between hydrogen chloride and acetylene in the presence of a catalyst and by splitting of hydrogen chloride from dichloroethane by hydrochlorination with alkalis. Polyvinyl chloride finds wide use in this invention and may be produced from polymerization of vinyl chloride monomer in a variety of ways such as by bulk polymerization, solution polymerization, and emulsion polymerization.

The primary technique of producing plastisol grade polyvinyl chloride resin is by emulsion polymerization. As is well known in the art, emulsion polymerization involves emulsifying the liquid vinyl chloride monomer in water by the use of surface active agents and agitation and thereafter promoting polymerization through the use of heat, catalysts, or a combination thereof. Emulsion polymerized polyvinyl chloride resin is a fine powder of a particle size sufficient to enable compounding with plasticizers to produce vinyl plastisols.

Plastisol grade polyvinyl chloride resin, as well as other vinyl chloride resins, are characterized mainly by their average molecular weight through the nomenclature of "intrinsic viscosity" or "IV." Generally the intrinsic viscosity or IV of a polyvinyl chloride resin ranges from less than 0.40 to in excess of 2.00. Resins in this whole range of intrinsic viscosities may be used in this invention, however, those in the viscosity range of about 0.60 to about 1.30 are preferred for their ease in processing, mixing, frothing, and shaping.

The plastisol grade polyvinyl chloride resin may be extended, diluted, or admixed with up to about 50 percent by weight with extender resins. Extender resins are generally low cost compatible (usually vinyl) resins whose main function is to reduce overall material cost without adversely affecting chemical or physical properties. This invention contemplates the use of up to 50 percent extender resins without serious effect on the strength of the final product. Examples of extender resins include polyvinyl chloride-vinyl acetate copolymers, polyvinyl chloride-vinylidene chloride copolymers, polyvinyl acetate, polyvinyl alcohol, polyvinylidene chloride, polyvinyl chloride-polybutadiene blends, and the like.

To the plastisol grade polyvinyl chloride resin is added at least one compatible liquid plasticizer. As in the case with almost all vinyl plastisols, the resin particles do not absorb the plasticizer until the later fusing operation so that this mixture of resin and plasticizer remains fluid. Later during curing, the resin particles absorb the plasticizers and form a mass of swollen particles. Upon further heating the resin particles fuse together to form a homogeneous matrix of resinous material wherein the plasticizer is homogeneously distributed throughout to render the cured product soft and pliable and to give the product its properties of drape, flexibility, hand and the like.

A number of plasticizers are available for this purpose and are contemplated in this invention. They range from the simple organic molecular structures, such as dioctyl phthalate, through the more highly branched molecules, such as butyl cyclohexyl phthalate, to the reactive plasticizers containing epoxy or other groups such as epoxidized soybean oil. Examples of other plasticizers usable herein include dibenzyl sebacate; dibutyl phthalate; dibutyl sebacate; dicapryl phthalate; bis-(diethylene glycol monoethyl ether) phthalate; di-(2-ethylhexyl) acetate; di-(2-ethylhexyl) phthalate; diisobutyl phthalate; dimethyl phthalate; di-2-ethylhexyl adipate; diocytl sebacate; phenol-formaldehyde thermoplastic resins; aromatic hydrocarbons from petroleum; di-iso-octyl phthalate; iso-octyl-iso-decyl phthalate; di-iso-decyl adipate; butyl iso-decyl phthalate; butyl octyl phthalate; dioctyl adipate; normal octyl-normal decyl phthalate; di-iso-decyl phthalate; and the like. The plasticizer and the polyvinyl chloride resin (with or without extender resins) are admixed together under mild agitation to produce a fluidic blend.

To the plastisol grade vinyl chloride resin and compatible liquid plasticizers is added a special emulsifier consisting of between 36–46 weight percent of a saturated or unsaturated fatty acid or mixtures thereof having from 12 to 24 carbon atoms, between 27–37 weight percent of an alkali salt of a saturated or unsaturated fatty acid or mixtures thereof having from 12 to 24 carbon atoms, between 6–16 weight percent of a member selected from the group consisting of potassium acid phthalate, sodium phthalate, and sodium acid phthalate, between 4–8 weight percent water, between 4–6 weight percent of a saturated aliphatic glycol, between 2–4 weight percent of a low molecular weight hydrocarbon oil, and between 1.5–2.5 weight percent of silic acid. An emulsifier of this type is commercially available from the R. T. Vanderbilt Company, Inc., New York, N.Y. under the trademark FOMADE B. This emulsifier, which is a light brown colored paste, is the only type of emulsifier known that will stabilize a frothed mixture of the plastisol grade vinyl chloride resin compatible liquid plasticizer, and the fluidic polyurethane precursor (to be hereinafter disclosed) throughout the frothing and subsequent process steps of this invention.

There are a variety of materials that may be used as the emulsifier components. For instance, the saturated or unsaturated acid may be lauric, myristic, palmitic, stearic, oleic, linoleic, and linoleinic acids with oleic acid preferred; the alkali salts of a saturated or unsaturated fatty acids may be the sodium or potassium salts of the above listed fatty acids with potassium oleate preferred; and the saturated aliphatic glycol may be polyethylene glycol, polypropylene glycol, and polybutylene glycol with polyethylene glycol preferred. The alkali salts of the saturated or unsaturated fatty acids may be added directly to the emulsifier or prepared in situ; the in situ preparation is fully within the ambit of one skilled in the chemical art—it generally comprises the addition of a soap-forming base such as sodium hydroxide, potassium hydroxide, etc., to the fatty acid.

This special emulsifier has an added unique property in that it causes a high degree of trimerization to take place between the active NCO groups in the precursor such as when the polyurethane precursor is prepared to have active NCO termination at the ends of the molecules. This trimerization appears to explain, at least in part, the unexpected increase in strength and other properties of the foam and materials made therefrom.

The fluidic polyurethane precursor (II) which forms the second component of the foam composition of this invention is prepared from the reaction between a polyol and a polyisocyanate. The polyol may be a polyester or polyether polyol and the preparation of the precursor may be conducted such as to obtain the precursor with active NCO terminal groups capable of further reaction, masked or blocked NCO terminal groups capable of further reaction when unblocked, or a nonreactive or a fully terminated polyurethane precursor. Each of these types of precursors impart separate advantages to certain products made from this composition and all are fully contemplated herein as will be subsequently explained.

The polyols usable herein as the basis of the precursor may be either a polyether polyol, a polyester polyol, or a mixture of the two. They may be selected from a wide range of molecular weights, however, the presence of the vinyl plastisol in fluidic blend (I) and subsequent processing conditions reduces the practical molecular weight range to between about 500 to about 3,000. Lower molecular weight polyols, e.g., below about 500, have relatively more polymer chains per unit weight hence there are more chain ends to react with the isocyanate. These lower molecular weight polyols, while of relatively low viscosity, form an extremely viscous chain-extended precursor and make mixing and frothing of components (I) and (II) difficult. Higher molecular weight polyols, e.g., above about 3,000, are viscous to start with and form even higher viscosity precursors causing the same mixing and frothing problems.

The viscosity of the prepolymer may be lowered by heating or solvent dilution, however, these techniques are severely limited. Heating cannot be taken over about 200° F. as it would cause immediate gelling of the vinyl plastisol in fluidic blend (I). Only high-boiling solvents may be used to dilute the viscous precursor as the exotherm produced from mixing of the two components would boil out low-boiling solvents. Furthermore, high-boiling solvents have a deteriorating influence on the frothed foam and their use should be limited to only a few parts or less. It has been found successful to use as a diluent some of the compatible liquid plasticizer from fluidic blend (I) and this technique is fully contemplated in this invention.

The precursor is used in a range of about 7 to about 19 parts by weight per 100 parts of the plastisol grade vinyl chloride resin. Below about 7 parts, the polyurethane does not provide sufficient fortification of the foam or enhancement of other properties for utilization in a manmade leather. In contrast, when used in excess of about 19 parts by weight a large quantity of resinous gel particles are produced in the frothing step which impairs the processing and degrades the quality of the foam.

As stated earlier, the precursor may be prepared to contain no reactive isocyanate end groups, contain masked or blocked isocyanate end groups, or contain fully reactive isocyanate end groups. These preparations are fully within the ambit of one skilled in the chemical art. To prepare an unreactive polyurethane precursor one merely reacts a polyol (either polyether or polyester) with a stoichiometric amount of a polyisocyanate so that all of the labile hydrogens in the polyol are reacted with the NCO groups in the isocyanate. To prepare a polyurethane precursor having instantly reactive residual NCO end groups one merely increases the amount of polyisocyanate. To prepare a masked or blocked isocyanate containing polyurethane precursor one may react the polyisocyanate with a stoichiometric deficiency of a masking agent, which is generally an easily dissociable polyhydric material such as a phenol, a cresol, an alcohol, etc., and thereafter combine that reaction product with the polyol. The residual or nonreacted NCO groups in the polyisocyanate chain-extend the polyol and further reaction therebetween may be occasioned by heating to raise the temperature sufficient to dissociate the masking agent and render the unblocked NCO groups reactive.

Polyester polyols for use herein are formed from the condensation of at least one polyhydric alcohol and at least one polycarboxylic acid. Examples of suitable polyhydric alcohols include the following: glycerol; pentaerythritol; ethylene glycol; diethylene glycol; polypentaerythritol; mannitol; trimethylolpropane; sorbitol; methyltrimethylolmethane; 1,4,6-octanetriol; butanediol; pentanediol; hexanediol; dodecanediol; octanediol; chloropentanediol; glycerol monoallyl ether; glycerol monoethyl ether; triethylene glycol; 2-ethylhexanediol-1,4; 3,3'-thiodipropanal; 4,4'-sulfonyldihexanol; cyclohexanediol-1,4; 1,2,6-hexanetriol; 1,3,5-hexanetriol; polyallyl alcohol; 1,3-bis (2-hydroxyethoxy) propane; 5,5'-dihydroxydiamyl ether; tetrahydrofuran-2,5-dipropanol; tetrahydrofuran-2,5-dipentanol; 2,5-dihydroxytetrahydrofuran; tetrahydrothiphene-2,5-dipropanol; tetrahydropyrrole-2,5-propanol; 3,4,5, hydroxytetrahydropyran; 2,5-dihydroxy-3,4-digydro-1,2-pyran; 4,4'-sulfinyldipropanol; 2,2-bis (4-hydroxyphenyl)-propane; 2,2'-bis (4-hydroxyphenyl)-methane, and the like. Examples of polycarboxylic acids for use herein include the following: phthalic acid; isophthalic acid; terephthalic acid; tetrachlorophthalic acid; maleic acid; dodecylmaleic acid; octadecenylmaleic acid; fumaric acid; aconitic acid, itaconic acid, trimellitic acid; tricarballylic acid; 3,3'-thiodipropionic acid; 4,4'-sulfonyldehexanoic acid; 3-octenedioic-1,7 acid; 3-methyl-3-decenedioic acid; succinic acid; adipic acid; 1,4-cyclo-hexadiene-1,2-dicarboxylic acid; 3-methyl-2,5-cyclohexadiene-1,2-dicarboxylic acid; 8,12-eicosadienedioc acid; 8-vinyl-10-octadecenedioic acid; and the corresponding acid anhydrides, acid chlorides, and acid esters such as phthalic anhydride, phthaloyl chloride, and the dimethyl ester of phthalic acid. Polyethers are generally made by reacting an alkylene oxide such as propylene oxide with a strong base such as potassium hydroxide.

The acid number of the polyester polyol should be maintained at a very low level i.e., below about 5 and preferably at or below about 1.0. The reason for this is that the carboxylic acid group, forming the acid number, will react with the isocyanate to produce a mixed carboxylic-carbamic anhydride which will either lose carbon dioxide to form an amide which will further react with isocyanate and produce an acylurea which causes branching and gel formation in the precursor reaction if their be one it will disproportionate into a urea or biuret and an anhydride wherein the biuret promotes branching and gel formation and wherein the anhydride is hydrolytically unstable and tends to break down (depolymerize) upon exposure to moisture. To preclude these problems, it is desirable to use polyester polyols having acid numbers below about 1.0.

A wide variety of polyisocyanate compounds may be used in the preparation of the precursor. Examples of some of these include toluene-2,4-diisocyanate, toluene-2,6-diisocyanate, 4,4'-diisocyanato diphenyl methane, 1,5 -naphtalenediisocyantate, cumene-2,4-diisocyanate, 4-methoxy-1,3-phenylenediisocyanate, 4-chloro-1,3-phenylene-diisocyanate, 4-bromo-1,3-phenylenediisocyanate, 4-bromo-1,3-phenylenediisocyanate, 4-ethoxy-1,3-phenylenediisocyanate, 2,4'-diisocyanate-diphenylether, 5,6-dimethyl-1,3-phenylenediisocyanate, 2,4-dimethyl-1,3-phenylenediisocyanate, 4,4'-diisocyanatodiphenylether, benzidienediisocyanate, 4,6-dimethyl-1,3-phenylenediisocyante, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4'-diisocyanatostilbene, 3,3'-dimethyl, 4,4'-diisocyanatodiphenyl, 3,3'-dimethoxy-4,4'-diisocyanatodiphenyl, 1,4-anthracene-diisocyanate, 2,4-fluorenediisocyanate, 1,8-naphthalenediisocyanate, 2,6-diisocyanatobenzfuran, and 2,4,6-toluenetriisocyanate. It is to be understood that mixtures of two or more of these polyisocyanates may be employed. Aromatic isocyanates are preferred, particularly toluene diisocyanate which produces a material having exceptionally fine break and hand—significantly better than any of the other polyisocyanate compounds.

It has been found that when the polyurethane precursor is prepared so that it contains less than about 1 percent residual reactive isocyanate groups the foam prepared therefrom exhibits a maximum in physical properties in combination with the desirable characteristics of hand, drape, break, etc. When the foam is saturated into a fibrous substrate, such as in the preparation of a manmade leather as hereafter disclosed, it has been found desirable to prepare the polyurethane precursor to contain approximately 2 to 10 percent and more preferably 6 to 7 percent residual reactive isocyanate groups. It is theorized that these NCO groups react in some manner with the fibers in the substrate thereby attaining a high degree of adhesion therebetween; this higher degree of adhesion imparts better physical properties to the cured product in the form of higher tensile strength, higher resistance to pilling and higher abrasion resistance.

In addition, certain observations lead to the conclusion that the emulsifier included in fluidic mixture (I) as hereinbefore described causes the nonreacted isocyanate groups of the polyurethane precursor to trimerize into a high strength three-dimensional cross linked structure—higher strength than that obtained by mere dimerization of the NCO groups. These observations in part include the noticeable lack of generation of $CO_2$ during mixing of the isocyanate reactive precursor with the water-containing fluidic blend of the plastisol resin, plasticizer and emulsifier. As is known in the art, dimerization of NCO groups is accompanied by evolution of copius volumes of carbon dioxide whereas the trimerization reaction evolves none.

Fluidic blend (I) and precursor (II) may contain other materials such as colorants, stabilizers, antioxidants, fillers, flame extinguishers, fungicides, and the like and all are fully contemplated in this invention. Colorants may be added to give color to the final compound and to mask subsurface discoloration and other visible irregularities and may be used in amounts ranging from about 1 to about 30 parts by weight. Examples of colorants usable herein include inorganic materials such as black iron oxide, manganese blue, iron oxide brown, chrome oxide green, molydate orange, cadmium red, mercury red, aluminum, mango violet, titanium oxide, cadmium yellow and the like and organic materials such as oil black, phthalocyanine blue lake, Zulu Green standard shade, Oil Orange powder, Alizarine Maroon lake, Plasticone Red Deep, Oil Red S powder, Stan-Tone MBS Aluminum, Benzidine yellow, and the like.

Stabilizers may be added to retard degradation of the resin caused by exposure to heat or light and may be used in amounts ranging from about 1 to about 30 parts by weight. Examples of stabilizers usable herein are lead salts such as basic lead carbonate, tribasic lead sulphate, dibasic lead phosphite, tri-basic lead maleate, normal lead stearate, di-basic lead stearate, di-basic lead phthalate, lead silicate, and lead salicylate; barium-cadmium-zinc combinations such as coprecipitated barium-cadmium and cadmium-zinc soaps of lauric, stearic, hydroxystearic, and other fatty acids, organotin compounds such as di-butyl tin dilaurate, di-butyl tin maleate, di-octyl tin maleate, di-butyl mercaptides, and the like; expoxidized oils such as expoxidized soya bean oil, expoxidized esters of tall oil and soya bean oil; chelating agents such as triphenyl phosphite; and others such as benzo-phenones, triazo compounds, phenyl salicylate, and sodium organo phosphates.

Anti-oxidants may be added to control polymer degradation through reaction with oxygen and ozone in the air and may be used in quantities ranging from a trace to about 10 parts. Examples include hydroquinone monobenzyl ether; alkylated bis-phenol; tri (nonylated phenyl) phosphite; 2,2'-dihydroxy-4,4'-dimethoxybenzophenone; and the like.

Fillers may be added to extend the compound and reduce its cost and in some cases to strengthen the material and may be used in amounts ranging from about 1 to about 50 parts by weight. Examples include calcium carbonate, magnesium carbonate, aluminum silicate, aluminum hydroxide, basic aluminum sulfate ammonium sulfate, Kaolin clay, silicon dioxide, calcium sulfate, muscovite, diatomaceous earth, silica, amorphous silica, extender resins, and the like.

Flame extinguishers may be added to reduce the hazard of flame of the material of this invention. Flame retardants such as antimony oxide, tris (2,3)-di-bromopropl phosphate, tetrabromophthalic anhydride, tetrabromobisphenol, perchloropentacyclodecane (65 percent chlorine), $C_{15} Cl_{12} H_6$, and the like may be used in quantities ranging from about 1 to about 20 parts by weight.

Fungicides may be added to resist the growth of fungus and other bacteria in the finished material; this is especially important in footwear. These fungicides may be added in amounts ranging from 0.01 parts per million to more than 5 parts by weight depending upon the nature and type of fungicide base, i.e., whether the fungicide is tied to a large molecule such as a plasticizer or whether it is added alone. Examples of fungicides usable herein include arsenated-epoxidized soybean oil, bis (tri-n-butyltin) sulfosalicylate, 3,5,4'-tri-bronco salicylanilide, N-(trichloromethylthia) phthalimide, quaternary ammonium naphthenate, phenyl mercury acetate, copper-8-quinolinolate, and the like.

The process of making the hydrophilic-poromeric foam of this invention is extremely important in that the formation of the ingredients, the mixing of the fluidic blend (I) and precursor (II), and the frothing of the mixture must be accomplished precisely and within the limits hereinafter specified so that the foam is properly developed in regard to cell size, density, and other properties, and so that the finished material exhibits the desirable properties of high abrasion resistance and strength in combination with hydrophilicity and poromericity.

Specifically, fluidic blend (I) is prepared by adding to 100 parts by weight of a plastisol grade polyvinyl chloride resin about 50 to 100 parts by weight of at least one compatible liquid plasticizer, a stabilizer for the polyvinyl chloride resin, and between about 10 to about 16 parts by weight of the aforedescribed special emulsifier. These components may be added in any manner, however, for convenience the plasticizer is added initially, the polyvinyl chloride resin added next, the stabilizer, emulsifier, and other optional additives are then added and mixed under mild agitation for about 5 minutes to form a low viscosity i.e., 20–100 centipoise liquid. Other ingredients such as the aforementioned colorants, flame retardants, fungicides and the like may be added at appropriate levels and all of these ingredients stirred into the fluidic blend.

Separately, a fluidic polyurethane precursor is prepared by reacting a polyisocyanate with either a polyether or polyester polyol. This is generally accomplished under anhydric and inert atmospheric conditions to prevent undesirable side reactions with the isocyanate. As previously described, depending upon the end use of the foam i.e., as a foam per se or as a saturant, the residual NCO content of the precursor may be varied from near 0 to about 10 percent. Thereafter, fluidic blend (I) is mixed with between about 7 to about 19 parts by weight of fluidic polyurethane precursor (II) under mild agitation and in the absence of air or other reactive gases and at room temperature to form the basic material for the foam. During mixing of the two components there is created a noticeable exotherm along with a slight effervescence which may be the result of a slight amount of dimerization of the reacted NCO group with the water and other labile hydrogen containing compounds, a nominal amount of trimerization of the same ingredients catalyzed by one or more of the components of the emulsifier, the heat of mixing of the components or, more realistically, a combination of all three phenomena. The resultant material is a rather viscous fluidic material. This viscous material is thereafter frothed with air or other non-reactive gas, in conventional frothing equipment into a foam having a density of about 0.5 grams per cubic centimeter to about 1.5 grams per cubic centimeter.

Another method of mixing fluidic blend (I) and precursor (II) is to bring them in separate lines to the mixing head of the frothing equipment so that they are intimately mixed and frothed simultaneously to produce the foam of the above described density range. Neither procedure appears to be better than the other and they may be interchanged and utilized depending upon the exigencies of the process equipment. The viscosity of the foam is attained and controlled by the speed of the frothing mixer and amount of gas injected into the frothing head.

The frothing gas may be virtually any nonreactive gas that does not impart hazardous or dangerous properties to the final foam; examples of gases usable herein include air, nitrogen, carbon dioxide, helium, and the like.

The frothing of the mixture may be produced in many types of frothing equipment such as a common milk shaker or other similar machines. Of particular utilization herein is a machine known as an Oakes mixer which is a water jacketed, high speed, emulsifying-whipping machine commercially available in the industry; this particular machine produces a creamy, smooth foam and is the preferred frothing device.

The foam is thereafter shaped for the desired product. For instance, the foam may be cast in a layer on a release paper (silicone treated or Teflon treated release paper) and passed through a curing oven. Alternatively, the foam may be cast in a layer over a fabric or other substrate so as to produce a supported material; examples of fabric usable herein include a woven nylon, cotton jersey, nonwoven rayon, etc.

The foam is thereafter subject to heat or other energy input to obtain a cure of the foam. By "curing" it is meant that the plastisol, i.e., fluidic blend of polyvinyl chloride resin in the plasticizer, will form into the aforesaid swollen particles filled with plasticizer and thereafter fuse into a homogeneous matrix of plasticized polyvinyl chloride. "Curing" also includes driving to completion the trimerization and/or other polymerization reactions of the polyurethane. For heat curing, the material may be cured over a wide temperature range such as at 450° F. for 15 minutes. Obviously, a lower temperature will require a somewhat longer curing time whereas a higher temperature will require a shorter curing time. Care should be taken that the curing temperature does not exceed the irreversible degradation temperature of the separate components; this aspect of the process is fully within the ambit of one skilled in the plastics art and is contemplated in this invention.

The foam may also be saturated into a fibrous mat and cured to produce a synthetic leatherlike material of such look feel, and other properties that only the most discerning individual can tell that it is not natural leather. The foam is saturated into the fibrous mat by such means as casting the foam on both surfaces of the mat and passing the mat through pressure rolls to force the foam into the interior of the mat. Other processes include dipping the mat in a bath of foam and thereafter running it through a set of squeeze rolls. The fibrous mat may be made of a number of different fibers such as natural, synthetic, and mixtures thereof. Examples of these include nylon, Dacron, Vycron, acrylic, rayon and cotton. All of these fibrous mats produce an extremely high quality synthetic leather material. This material may then be cured in the same manner as the above-described materials.

The synthetic leather material produced above may be split and skived to produce synthetic leathers of different weights and uses. For example, a 3 denier, 1½ inches, staple nylon fiber mat of 15 ounces per square yard may be heavily needled and pressed to form a dense fibrous mat. Said mat may then be saturated with the foam of this invention, cured at 400° F. for 3½ minutes, and then split into 45 mil thick sheets (for men's weight shoes) or 35-mil thick sheets (for women's weight shoes). This material may thereafter be buffed, embossed, printed, etc., and used as is, top-coated with finishes such as urethane and acrylic coatings to more closely simulated leather, or top-coated with more of the same foam. Typical properties of these materials are: tensile strength (p.s.i.) 1,150 (warp) 1,850 (fill), tear strength (lb./in.) 310 (warp) 450 (fill); elongation (percentage) 8 (warp) 11 (fill); and MVT 8,000 grams per square meter per 24 hours.

The abrasion resistance of this material is measured via a Ford Scuff tester and a Taber Abrasion tester; however, because these are resilient foam structures instead of solid structures, the standard abrasion test is not applicable. Generally, the test is conducted on a sample of foam by running either or both tests to 1,000 cycles (of the abrasion device) and checking the surface for evidence of wear. If no wear is evident then the material is rated "acceptable" whereas if wear is evident the material is "unacceptable." Water pickup is determined by soaking the sample in water for 24 hours and determining the amount of weight increase.

The following examples are given to show one skilled in the art an indication of how to practice the invention and to indicate some of the degrees of freedom of ingredients and processing conditions. Unless otherwise noted, all parts are parts per 100 parts of resin and all percentages are percentages by weight.

EXAMPLE 1

Two liquid components (I) and (II) were formulated from the ingredients shown below in Table 1a. Fluidic blend (I) was made by slowly adding the plastisol grade polyvinyl chloride resin the the plasticizers under mild agitation and thereafter adding the other ingredients. Precursor (II) was made by reacting a molar excess of toluene diisocyanate with a 1,000 molecular weight polyester resin (acid number 0.50) at 180° F. under mild agitation, anhydrous conditions and exclusive of air and other reactive gas, for about 15 minutes or until no further exotherm was observed to obtain a polyurethane that contained approximately 6 percent of the original NCO groups in the unreacted state.

Table 1a

| Fluidic Blend I | Parts |
|---|---|
| Geon 121[2] (Plastisol PVC resin - IV=1.19) | 100.0 |
| Plasticizer (dioctyl adipate) | 25.0 |
| Plasticizer (N-trimellitate) | 44.0 |
| Plasticizer (99 percent epoxidized soybean oil with 1 percent 1,10 oxybisphenoxarsine fungicide) | 4.0 |
| Barium-Cadmium stabilizer | 2.0 |
| Emulsifier:[3] | 11 15.0 |
| 1. 41 weight percent oleic acid; | |
| 2. 32 weight percent potassium oleate; | |
| 3. 11 weight percent potassium acid phthalate; | |
| 4. 6 weight percent water; | |
| 5. 5 weight percent polyethylene glycol; | |
| 6. 3 weight percent of a low molecular carbon oil; and, | |
| 7. 2 weight percent of silicic acid; and, | |
| Precursor II | Parts |
| 1000 MW Polyesterurethane 6 percent unreacted NCO, toluene diisocyanate | 15.0 |

2. B. F. Goodrich Chemical Company

3. FOMADE B., R. T. Vanderbilt Company

Components (I) and (II) were blended together at room temperature in a nitrogen purged pot under mild agitation for 15 minutes to produce a viscous fluid. The mixture was then pumped (Moyno pump) into an Oakes mixer under a nitrogen blanket; a nitrogen line was attached to the Oakes mixer head and the pressure set at 150 p.s.i.g. The Oakes mixer was set to 180 r.p.m. and the nitrogen flow rate adjusted to pass 23 cubic centimeters of nitrogen per second to the mixer. After lining out, the Oakes mixer produced a foam having a density of 0.73–0.77 gm./cc. The foam was processed in three ways: part of the foam was cast on silicone treated release paper in a 50-mil thickness, more of the foam was cast in a 50-mil thickness onto a cotton jersey backing cloth; and a third sample of foam was saturated into a 3 denier, 14 ounces per square yard, heavily needled nylon mat. All three samples were passed through the curing oven and cured at 450° F. for 15 minutes. The saturated material was split into gauges of 45 mils (men's weight) and 35 mils (women's weight) and each slice buffed on one side. Below in Table 1b are listed the different samples prepared in this example and some of the physical properties of each.

TABLE 1b

| | Gauge (mils) | Water pick-up (percent) | Tensile strength (p.s.i.) | Elongation (percent) | Tear (lbs./in.) | MVT (gm./m.²/ 24 hrs.) | Taber abrasion 1,000 cycles |
|---|---|---|---|---|---|---|---|
| Foam sheet | 20 | 75 | 400 | 250 | 100 | 7,000 | Acceptable. |
| Cotton jersey supported foam sheet | 35 | 80 | 950 | 50 | 150 | 6,500 | Do. |
| Nylon mat saturated with foam (men's weight) | 45 | 90 | 1,270 | 11 | 220 | 8,600 | Do. |
| Nylon mat saturated with foam (women's weight) | 35 | 90 | 1,000 | 13 | 340 | 9,600 | Do. |

This example shows the operability of the basic process of this invention to produce the novel poromeric-hydrophilic foam and the novel synthetic leather of this invention. In addition, this example shows that fluidic blends (I) may contain other ingredients in addition to the plastisol polyvinyl chloride resin, at least one compatible liquid plasticizer, and the emulsifier.

EXAMPLE 2

Two liquid components (I) and (II) were formulated from the ingredients shown below in Table 2a except that the intrinsic viscosity of the plastisol grade polyvinyl chloride resin was varied. The method of making the components, mixing them together, and frothing the mixture was identical to that described in Example 1.

Table 2a

| Fluidic Blend I | A | B | C |
|---|---|---|---|
| Plastisol grade PVC Resin (IV=0.75) | 100 | | |
| Plastisol grade PVC Resin (IV=1.20) | | 100 | |
| Plastisol grade PVC Resin (IV=1.27) | | | 100 |
| Plasticizer (dioctyl phthalate) | 73.0 | 73.0 | 73.0 |
| Pigment (Iron oxide brown) | 0.5 | 0.5 | 0.5 |
| Emulsifier (see Table 1a) | 15.0 | 15.0 | 15.0 |
| Precursor II | A | B | C |
| 1000 mw. Polyesterurethane 6 percent unreacted NCO, toluene diisocyanate | 15.0 | 15.0 | 15.0 |

Samples A, B, and C were separately saturated into samples of a 3 denier, 14 ounces per square yard needled nylon mat by dipping the mat into the frothed mixtures of components (I) and (II), passing the wetted mat through a set of squeeze rolls drying the mat at 350° F. for 20 minutes and slitting the mat to a 45 mil sheet and buffing one surface thereof. Table 2a shows the physical properties of these samples.

TABLE 2b

| | Tensile strength, (p.s.i.) | Tear strength, (p.s.i.) | Elongation (percent) | MVT, gm./m.²/ 24 hrs. | Water pick-up (percent) | Taber abrasion 1,000 cycles | Ford scuff 1,000 cycles |
|---|---|---|---|---|---|---|---|
| Samples: | | | | | | | |
| A | 1,900 | 485 | 12 | 8,100 | 100 | Acceptable | Acceptable. |
| B | 1,820 | 400 | 9 | 9,350 | 90 | do | Do. |
| C | 1,325 | 350 | 20 | 9,600 | 95 | do | Do. |

This example shows that the plastisol grade polyvinyl chloride resin usable in this invention may be chosen from a wide range of intrinsic viscosities.

EXAMPLE 3

Two liquid components (I) and (II) were formulated from the ingredients shown below in Table 3a except that an extender resin was used to replace part of the plastisol grade polyvinyl chloride resin. Components (I) and (II) were made, mixed together, and processed in a manner identical to the described in Example 1 and the foam saturated into the nylon fibrous mat and processed as described in Example 2. In Table 3b appear the physical properties.

Table 3a

| Fluidic Blend I | Samples | | |
|---|---|---|---|
| | A | B | C |
| Geon 121 | 100 | 75 | 50 |
| Cadmium-Barium Stabilizer | 4.0 | 4.0 | 4.0 |
| Pliovic M-90[4] | | 25 | 50 |
| Pigment (iron oxide brown) | 0.5 | 0.5 | 0.5 |
| Plasticizer (dioctyl phthalate) | 44.0 | 44.0 | 44.0 |
| Plasticizer (epoxidized soyabean oil) | 29.0 | 29.0 | 29.0 |
| Emulsifier (see Table 1a) | 15.0 | 15.0 | 15.0 |
| Precursor II | | | |
| 1000 MW Polyesterurethane 6 percent unreacted NCO, toluene diisocyanate | 15.0 | 15.0 | 15.0 |

4. Extender resin, Goodyear Tire & Rubber Company

TABLE 3b

| | Tensile strength (p.s.i.) | Tear strength (lb./in.) | Elongation (percent) | MVT gm./m.²/ 24 hr. | Water pick-up (percent) | Taber abrasion 1,000 cycles | Ford scuff 1,000 cycles |
|---|---|---|---|---|---|---|---|
| Sample: | | | | | | | |
| A | 1,900 | 485 | 12 | 8,100 | 100 | Acceptable | Acceptable. |
| B | 1,400 | 405 | 9 | 9,500 | 95 | do | Do. |
| C | 900 | 320 | 9 | 10,000 | 80 | do | Do. |

This example shows that the plastisol grade polyvinyl chloride resin of this invention may be extended with resins and still form an operable product.

EXAMPLE 4

Two liquid components (I) and (II) were prepared from the ingredients shown below in Table 4a except that the type of plasticizer and the type of isocyanate were varied. The components were made, mixed together, and frothed in a manner identical to that described in Example 1 and the foam saturated into a nylon fibrous mat and processed as described in Example 2. In Table 4b appear the physical properties.

Table 4a

| Fluidic Blend I | A | B | C | D |
|---|---|---|---|---|
| Geon 121 | 100 | 100 | 100 | 100 |
| Plasticizer (dioctyl adipate) | 70 | 40 | 20 | |
| Plasticizer (Polymeric MW 6,000) | | 30 | 30 | 40 |
| Plasticizer (polymeric MW 3500) | | | 20 | 30 |
| Cadmium-Barium stabilizer | 4.0 | 4.0 | 4.0 | 4.0 |
| Emulsifier (see Table 1a) | 15.0 | 15.0 | 15.0 | 15.0 |
| Precursor II | | | | |
| 1000 MW Polyesterurethane 80/20 TDP 6 percent unreacted NCO Precursor II | 15.0 | 15.0 | | |

| 1000 MW Polyesterurethane MDI[6] 1000 MW 6 percent unreacted NCO | 15.0 | 15.0 |
|---|---|---|

5. 80 percent 2,4-toluene diisocyanate, 20 percent 2,6-toluene diisocyanate.

6. 100 percent 4,4'-diisocyanato diphenylmethane.

TABLE 4b

| | Tensile strength (p.s.i.) | Tear strength (lb./in.) | Elongation (percent) | MVT gm./m.²/ 24 hr. | Water pick-up (percent) | Taber abrasion 1,000 cycles | Ford scuff 1,000 cycles |
|---|---|---|---|---|---|---|---|
| Sample: | | | | | | | |
| A | 1,700–1,800 | 550–575 | 80–90 | 7,000 | 110 | Acceptable | Acceptable. |
| B | 1,750–1,850 | 500–580 | 70–90 | 7,400 | 90 | do | Do. |
| C | 1,500–2,000 | 390–55 | 70–90 | 9,560 | 85 | do | Do. |
| D | 1,500–1,700 | 440–55 | 85–105 | 10,300 | 100 | do | Do. |

This example shows that the compatible liquid plasticizers for fluidic blend (I) may be chosen from a wide range of molecular weights and types. This example further shows that different types of isocyanates and isocyanate compositions may be used in making precursor (II).

EXAMPLE 5

Two liquid components (I) and (II) were prepared from the ingredients shown below in Table 5a except that the type of polyurethane prepolymer polyol was varied. The components were made, mixed together, and frothed in a manner identical to that described in Example 1 and the foam was saturated into a nylon fibrous mat and processed as described in Example 2. In Table 5b appear the physical properties.

Table 5a

| Fluidic Blend I | Samples | | |
|---|---|---|---|
| | A | B | C |
| Geon 121 | 100 | 100 | 100 |
| Plasticizer (dioctyl phthalate) | 44.0 | 44.0 | 44.0 |
| Plasticizer (polymeric MW 4500) | 25.0 | 25.0 | 25.0 |
| Plasticizer (epoxidized soyabean oil) | 4.0 | 4.0 | 4.0 |
| Pigment (iron oxide brown) | 0.5 | 0.5 | 0.5 |
| Cadmium-Barium stabilizer | 4.0 | 4.0 | 4.0 |
| Emulsifier (see Table 1a) | 15.0 | 15.0 | 15.0 |
| Precursor II | | | |
| 1000 MW Polyesterurethane 6 percent unreacted NCO 80/20:2,4/2,6 toluene diisocyanate Precursor II | 15.0 | | |
| 1000 MW Polyetherurethane 6 percent unreacted NCO 80/20:2,4/2,6 toluene diisocyanate Precursor II | | 15.0 | |
| 1000 MW/1000 MW polyester/polyether 50/50 polyurethane 6 percent unreacted NCO, 80/20:2,4/2,6 toluene diisocyanate | | | 15.0 |

This example shows that the polyurethane prepolymer may be comprised of polyester polyols, polyether polyols, and mixed polyester polyether polyols.

EXAMPLE 6

Two liquid components (I) and (II) were prepared from the ingredients shown below in Table 6a except that the type of polyurethane precursor isocyanate was varied. The components were made, mixed, and frothed in a manner identical to that described in Example 1 and the foam saturated into a nylon fibrous mat and processed as described in Example 2. In Table 6b appear the physical properties.

Table 6a

| Fluidic Blend I | Samples | | |
|---|---|---|---|
| | A | B | C |
| Geon 121 | 100 | 100 | 100 |
| Plasticizer (dioctyl phthalate) | 44.0 | 44.0 | 44.0 |
| Plasticizer (polymeric MW 4500) | 25.0 | 25.0 | 25.0 |
| Plasticizer (epoxidized soyabean oil) | 4.0 | 4.0 | 4.0 |
| Pigment | 0.5 | 0.5 | 0.5 |
| Cadmium-Barium stabilizer | 4.0 | 4.0 | 4.0 |
| Emulsifier (see Table 1a) | 15.0 | 15.0 | 15.0 |
| Precursor II | | | |
| Polyesterurethane 6 percent unreacted NCO 80/20:2,4/2,6 toluene diisocyanate Precursor II | 15.0 | | |
| Polyesterurethane 6 percent unreacted NCO 65/35:2,4/2,6 toluene diisocyanate Precursor II | | 15.0 | |
| Polyesterurethane 6 percent unreacted NCO 2,2'-diisocyanato diphenyl methane | | | 15.0 |

TABLE 5b

| | Tensile strength (p.s.i.) | Tear strength (lbs./in.) | Elongation (percent) | Water pick-up (percent) | MVT gm./m.²/ 24 hr. | Taber abrasion 1,000 cycles | Ford scuff 1,000 cycles |
|---|---|---|---|---|---|---|---|
| Samples: | | | | | | | |
| A | 950–1,325 | 160–350 | 8–20 | 110 | 9,600 | Acceptable | Acceptable. |
| B | 1,320–2,200 | 320–520 | 80–105 | 100 | 10,000 | do | Do. |
| C | 915–1,700 | 235–420 | 13–18 | 95 | 9,600 | do | Do' |

TABLE 6b

| | Tensile strength (p.s.i.) | Tear strength (lbs./in.) | Elongation (percent) | Water pick-up (percent) | MVT gm./m.²/ 24 hr. | Taber abrasion 1,000 cycles | Ford scuff 1,000 cycles |
|---|---|---|---|---|---|---|---|
| Samples: | | | | | | | |
| A | 1,125–2,100 | 300–475 | 8–11 | 105 | 8,100 | Acceptable | Acceptable. |
| B | 1,040–2,025 | 277–500 | 11–20 | 95 | 9,600 | do | Do. |
| C | 950–1,300 | 200–350 | 11–20 | 100 | 9,600 | do | Do. |

This example shows that a wide range of isocyanate compounds may be used in the preparation of the polyurethane precursor of this invention.

EXAMPLE 7

Two liquid components (I) and (II) were prepared from the ingredients shown below in Table 7a. The components were made, mixed, and frothed in a manner identical to that described in Example 1.

Table 7a

| Fluidic Blend I | Parts |
| --- | --- |
| Geon 121 | 100.0 |
| Plasticizer (dioctyl phthalate) | 25.0 |
| Plasticizer (dioctyl adipate) | 44.0 |
| Plasticizer (99 percent epoxy plasticizer-1 percent 1,10 oxybisphenoxarsine) | 4.0 |
| Barium-Cadmium stabilizer | 2.0 |
| Emulsifier (see Table 1a) | 15.0 |

| Precursor II | |
| --- | --- |
| 1000 MW Polyesterurethane 6 percent unreacted NCO 80/20:2,4/2,6 toluene diisocyanate | 15.0 |

Each component was divided into two portions. One portion (Sample A) of component (I) and one portion (Sample B) of component (II) were blended together and frothed in a manner identical to that described in Example 1 and saturated into a nylon mat as described in Example 2. The second portion (Sample B) components (I) and (II) were kept separate and thereafter blended in the mixing heat of an Oakes mixer via separate lines from their respective containers into the mixer. The foam produced was thereafter saturated into a nylon mat and processed as described in Example 2.

Below in Table 7b are the physical properties of the samples so produced.

TABLE 7b

| Samples | Tensile strength (p.s.i.) | Tear strength (lbs./in.) | Elongation (percent) | Water pick-up (percent) | MVT gm./m.²/ 24 hr. | Taber abrasion 1,000 cycles | Ford scuff 1,000 cycles |
| --- | --- | --- | --- | --- | --- | --- | --- |
| A | 1,000–1,820 | 260–450 | 5–9 | 100 | 9,500 | Acceptable | Acceptable. |
| B | 1,050–1,820 | 250–400 | 6–9 | 95 | 9,350 | do | Do. |

This example shows that components (I) and (II) may be reacted prior to being frothed or may be reacted simultaneously with frothing and that the product produced therefrom is of the same physical properties.

EXAMPLE 8

Two liquid components (I) and (II) were prepared from ingredients shown below in Table 8a. Blending, mixing, and frothing was accomplished in a manner identical to that in Example 1 except that different frothing gases were used. The foams were thereafter saturated into a nylon mat and processed as described in Example 2. In Table 8b appear the physical properties.

Table 8a

| 8 Fluidic Blend I | Parts |
| --- | --- |
| Geon 121 | 100.0 |
| Plasticizer (dioctyl phthalate) | 25.0 |
| Plasticizer (polymeric MW 3500) | 44.0 |
| Plasticizer (99 percent epoxy plasticizer 1 percent 1,10 oxybisphenoxarsine) | 4.0 |
| Barium-Cadmium stabilizer | 2.0 |
| Emulsifier (see Table 1a) | 15.0 |

| Precursor II | |
| --- | --- |
| 1000 MW Polyesterurethane 6 percent unreacted NCO 80/20:2,4/2,6 toluene diisocyanate | 15.0 |

TABLE 8b

| Samples | Tensile strength (p.s.i.) | Tear strength (lbs./in.) | Elongation (percent) | Water pick-up (percent) | MVT gm./m.²/ 24 hrs. | Taber abrasion 1,000 cycles | Ford scuff 1,000 cycles |
| --- | --- | --- | --- | --- | --- | --- | --- |
| A Air frothed | 1,000–1,820 | 250–400 | 5–9 | 100 | 9,350 | Acceptable | Acceptable. |
| B Nitrogen frothed | 1,050–1,800 | 260–400 | 5–9 | 100 | 9,400 | do | Do. |
| C Carbon dioxide frothed | 1,050–1,840 | 200–420 | 5–9 | 105 | 9,200 | do | Do. |

EXAMPLE

Two liquid components (I) and (II) were prepared from ingredients shown below in Table 9a. Blending, mixing, and frothing was accomplished in a manner identical to that described in Example 1. The foam was saturated into needled fibrous mats made of different fibers and processed in a manner identical to that described in Example 2. In Table 9b appear the physical properties.

Table 9a

| Fluidic Blend I | Parts |
| --- | --- |
| Geon 121 | 100.0 |
| Plasticizer (dioctyl phthalate) | 25.0 |
| Plasticizer (polymeric MW 4500) | 44.0 |
| Plasticizer (99 percent epoxy plasticizer-1 percent 1,10 oxybisphenoxarsive) | 4.0 |
| Barium-Cadmium stabilizer | 2.0 |
| Emulsifier (see Table 1a) | 15.0 |

| Precursor II | |
| --- | --- |
| 1000 MW Polyesterurethane 6 percent unreacted NCO 80/20:2,4/2,6 toluene diisocyanate | 15.0 |

TABLE 9b

| Material | Tensile strength (p.s.i.) | Ford scuff 1,000 cycles | Tear strength (lbs./in.) | Taber abrasion 1,000 cycles | Elongation, percent | Water pick-up, percent | MVT, gm./m.²/ 24 hrs. |
| --- | --- | --- | --- | --- | --- | --- | --- |
| 70% nylon, 30% rayon | 850–1,400 | Acceptable | 260–375 | Acceptable | 45–75 | 110 | 9,700 |
| 100% Dacron® | 830–1,400 | do | 260–370 | do | 40–60 | 105 | 11,700 |
| 100% Vycron® | 1,060–1,685 | do | 300–375 | do | 70–100 | 110 | 10,000 |
| 100% acrylic | 205–430 | do | 70–110 | do | 45–85 | 100 | 10,400 |
| 100% rayon | 625–1,000 | do | 150–180 | do | 40–80 | 95 | 9,600 |

NOTE.—This example shows that the foam of this invention may be saturated into a wide variety of fibrous mats to produce a high strength, poromeric-hydrophilic material.

EXAMPLE 10

A fluidic mixture was prepared from the ingredients shown below in Table 10. The vinyl chloride resin and the plasticizer were blended together under mild agitation and then the water, polyester resin, and vinyl stabilizer added and blended. To this blend was added 5 parts of an 80/20 mixture of 2,4/2,6 isomers of toluene diisocyanate. Upon addition of the isocyanate, the mixture began to violently foam from the chemical reaction of the isocyanate with the water. Attempts were made to froth this mixture in an Oakes mixer with nitrogen however the mixer jammed with gel so rapidly that no foam could be made.

Table 10

| Ingredients | Parts |
| --- | --- |
| Plastisol grade polyvinyl chloride resin (IV-1.20) | 100.00 |
| Plasticizer (dioctyl phthalate) | 75.00 |
| Water | 5.00 |
| 1000 MW polyester resin (acid No. 0.6) | 11.00 |
| Vinyl stabilizer (barium-cadmium compound) | 2.00 |
| Toluene diisocyanate | 5.00 |

This example shows that mere addition of a polyol, water, and an isocyanate to a vinyl plastisol does not produce the poromeric-hydrophilic foam of this invention.

EXAMPLE 11

A mixture was prepared of 100 parts of a plastisol grade polyvinyl chloride resin, 70 parts of a compatible liquid plasticizer, 4 parts of a barium-cadmium stabilizer, and 15 parts of potassium-oleate. This blended mixture was passed to an Oakes mixer and foamed with air to a density of 1.1 grams per cubic centimeter. Thereafter, one portion of the foam was saturated into a nylon mat and processed in a manner identical to that described in Example 2 and the other portion of the foam was cast on release paper and cured. In Table 11 appear the physical properties.

TABLE 11

| Material | Ford scuff | Taber abrasion | Water pick-up (percent) | Tensile strength (p.s.i.) | Elongation (percent) | Tear strength (lbs./in.) | MVT, gm./m.²/ 24 hrs. |
| --- | --- | --- | --- | --- | --- | --- | --- |
| Foam saturated mat. | 1,000 cycles unacceptable. | 1,000 cycles unacceptable. | 100 | 850 | 45 | 75 | 8,500 |
| Foam | 17 cycles unacceptable. | 25 cycles unacceptable. | 85 | 70 | 200 | 10 | 8,500 |

NOTE.—This example shows that a polyvinyl chloride plastisol foam saturant does not possess the properties of the foam of this invention.

What is claimed is:

1. A hydrophilic-poromeric foam comprising the cured frothed mixture of:
   i. a fluidic blend comprising:
      a. 100 parts by weight of a plastisol grade vinyl chloride resin;
      b. between about 50 to about 100 parts by weight of at least one compatible liquid plasticizer;
      c. a stabilizer for said vinyl chloride resin;
      d. between about 10 to about 16 parts by weight of an emulsifier comprising:
         1. between 36–46 weight percent of a saturated or unsaturated fatty acid having from 12–24 carbon atoms and mixtures thereof;
         2. between 27–37 weight percent of an alkali salt of a saturated or unsaturated fatty acid having from 12–24 carbon atoms and mixtures thereof;
         3. between 6–16 weight percent of a member selected from the group consisting of potassium acid phthalate, sodium phthalate, and sodium acid phthalate;
         4. between 4–8 weight percent water;
         5. between 4–6 weight percent of a saturated aliphatic glycol;
         6. between 2–4 weight percent of a low molecular weight hydrocarbon oil; and
         7. between 1.5–2.5 weight percent of silicic acid; and,
   ii. between about 7 to about 19 parts by weight of a fluidic polyurethane precursor prepared from the reaction between a polyol selected from the group consisting of polyester polyols, polyether polyols, and mixtures thereof and a polyisocyanate.

2. The foam of claim 1 wherein said plastisol grade polyvinyl chloride resin has an intrinsic viscosity of from about 0.60 to about 1.30.

3. The foam of claim 1 wherein said liquid plasticizer contains a fungicide.

4. The foam of claim 1 wherein said stabilizer for said polyvinyl chloride resin is a barium cadmium stabilizer.

5. The foam of claim 1 wherein said fluidic polyurethane precursor contains from about 1 to about 8 percent of unreacted NCO groups.

6. The foam of claim 1 wherein said polyol used to prepare said fluidic polyurethane precursor is a polyester polyol.

7. The foam of claim 1 wherein said polyol used to prepare said fluidic polyurethane precursor is a polyether polyol.

8. The foam of claim 1 wherein said fluidic polyurethane precursor is prepared from the reaction between a polyol and a molar excess of an isocyanate and wherein the unreacted NCO groups in the precursor are thereafter reacted with a labile hydrogen containing material.

9. The foam of claim 1 wherein said emulsifier consists of:
   1. 41 weight percent oleic acid;
   2. 32 weight percent potassium oleate;
   3. 11 weight percent potassium acid phthalate;
   4. 6 weight percent water;
   5. 5 weight percent polyethylene glycol;
   6. 3 weight percent of a low molecular carbon oil; and,
   7. 2 weight percent of silicic acid.

10. A method of making a hydrophilic-poromeric foam comprising:
   a. preparing a fluidic blend (I) of:
      1. 100 parts by weight of a plastisol grade polyvinyl chloride resin;
      2. between about 50 to about 100 parts by weight of at least one compatible liquid plasticizer;
      3. a stabilizer for said polyvinyl chloride resin; and,
      4. between about 10 to about 16 parts by weight of an emulsifier comprising:
         a.' between 36–46 weight percent of a saturated or unsaturated fatty acid having from 14–24 carbon atoms and mixtures thereof;
         b.' between 27–37 weight percent of an alkali salt of a saturated or unsaturated fatty acid having from 12–24 carbon atoms and mixtures thereof;
         c.' between 6–16 weight percent of a member selected from the group consisting of potassium acid phthalate, sodium phthalate, and sodium acid phthalate;
         d.' between 4–8 weight percent water;

e.' between 4–6 weight percent of a saturated aliphatic glycol;

f' between 2–4 weight percent of a low molecular weight hydrocarbon oil; and, g.' between 1.5–2.5 weight percent of silicic acid; and, b. separately preparing a fluidic polyurethane precursor (II) from a polyol selected from the group consisting of polyester polyols, polyether polyols, and mixtures thereof and an isocyanate;

c. combining fluidic blend (I) with between about 7 to about 19 parts by weight of fluidic polyurethane precursor (II) to form a fluidic mixture;

d. frothing said fluidic mixture with a nonreactive gas to form a foam;

e. shaping said frothed foam; and, f. curing said shaped frothed foam with heat.

11. The method of claim 10 wherein said step of combining fluidic blend (I) with between about 7 to about 19 parts by weight of fluidic polyurethane precursor (II) to form said fluidic mixture and said step of frothing said fluidic mixture with a nonreactive gas to form a foam are accomplished simultaneously in the mixing head of a frothing machine.

12. The method of claim 10 wherein said step of preparing said fluidic polyurethane precursor (II) is accomplished such that said precursor (II) contains from about 1 to about 8 percent of unreacted NCO groups.

13. The method of claim 10 wherein said step of preparing said precursor (II) is accomplished by reacting a polyol with a molar excess of an isocyanate to form a precursor having unreacted NCO groups and then combining said precursor with a labile hydrogen containing material in sufficient quantity to react with said unreacted NCO groups and form a polyurethane precursor II having essentially no unreacted NCO groups.

14. The method of claim 10 wherein said step of preparing a fluidic polyurethane precursor (II) is accomplished using a polyester polyol.

15. The method of claim 10 wherein said step of preparing a fluidic polyurethane precursor (II) is accomplished using a polyether polyol.

* * * * *